Nov. 30, 1943.     L. A. SPIEVAK     2,335,614

DRILL GUIDE

Filed Feb. 25, 1943

INVENTOR
LOUIS A. SPIEVAK,
BY
ATTORNEY.

Patented Nov. 30, 1943

2,335,614

UNITED STATES PATENT OFFICE 2,335,614

DRILL GUIDE

Louis A. Spievak, West Los Angeles, Calif.

Application February 25, 1943, Serial No. 477,017

12 Claims. (Cl. 77—55)

My invention relates to drill guides and has particular reference to a guide adapted to be associated with a drill press or hand drill to engage a drill of the twist drill type adjacent to the surface of a workpiece to be drilled to prevent bending of the drill and to aid in holding the drill press or hand drill in alignment with the axis of the hole to be drilled in the workpiece.

In connection with drilling operations performed either by a stationary drill press or hand drilling machines, it has become the practice to provide a drill guide attached to the drill press or drilling tool which will surround the outer end of a twist drill or other slender cutting tool for the purpose of holding the outer end of the drill in alignment with the axis of rotation of the drill, such drill guides being required to be so constructed as to recede away from the surface of the workpiece which is being drilled as the drill penetrates into the workpiece.

The previous drill guides of this character were considerably bulky in their construction since they were required to extend about and enclose the drill chuck and these devices also were of considerable length due to the construction of the extendible and retractable guide member, requiring the use of twist drills or cutting tools of considerably greater length than was actually required for the drilling operations and of greater length than the ordinary standard drill lengths for given diameters of drills.

It is, therefore, an object of my invention to provide a drill guide which may be readily associated with any of the drilling machines now in use and in which the overall length of the drill guide is sufficiently short to permit the use therewith of standard length twist drills or cutting tools.

Another object of my invention is to provide a drill guide of the character set forth in which a stationary body is adapted to be secured to the drilling machine and an extensible and retractable drill guide and a spring for urging the guide toward its extended position are so assembled with the body as to provide a minimum of distance between the outer end of the guide and the drill chuck of the machine.

It is an additional object of my invention to provide a drill guide of the character set forth hereinbefore in which a single body member may be employed with interchangeable drill guide members to adapt the device for use with various daimeters of drills or cutting tools.

It is a still further object of my invention to provide a drill guide of the character set forth in the preceding paragraphs in which the extensible and retractable drill guide member may be readily detached from its supporting body for replacement.

Other objects and advantages of my invention will be apparent from a study of the following specifications, read in connection with the accompanying drawing, wherein.

Figure 1:
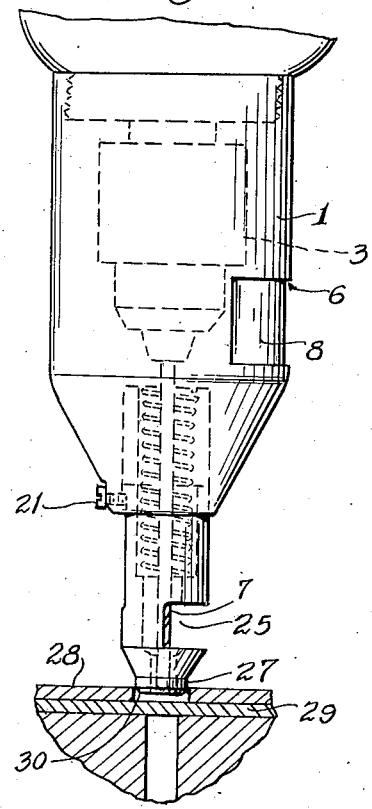
Fig. 1 is an elevational view of my drill guide pressure foot in its inactive or extended position.

Referring to the drawing, I have illustrated in Fig. 1 a drill guide pressure foot constructed in accordance with my invention as comprising a body member 1, the upper portion of which is hollow as indicated at 2 to provide a housing into which may extend the drill chuck 3 of a drill press or other drilling machine, the upper end of the body having an internally threaded bore 4 adapted to be threaded upon a threaded boss 5 formed upon the drill motor or stationary chuck mounting sleeve of a drill press.

Since the body 1 completely surrounds and encloses the chuck 3, access to the chuck may be provided through a side opening 6 extending through the side wall of the housing and through which suitable wrenches or tools may be inserted to operate the chuck 3 upon the insertion or removal of drills 7.

Figure 2:
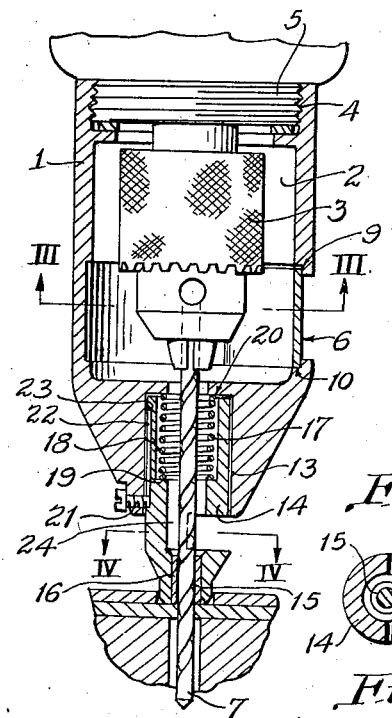
Fig. 2 is a vertical sectional view of my drill guide pressure foot illustrating the position of the parts when the pressure foot is in its retracted position.
Figure 3:
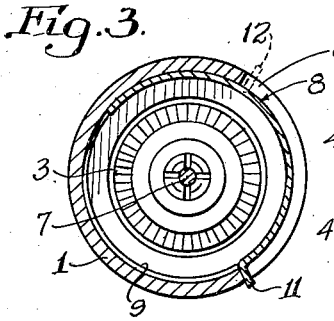
Fig. 3 is a transverse sectional view taken along the line III—III of Fig. 2.

A closure for the opening 6 may be provided as indicated particularly in Figs. 1, 2 and 3 comprising a band or strip of metal 8 having a length sufficient to extend about a little more than half of the circumference of the body 1. Engagement of the strip 8 with the interior walls of the body 1 will mount the strip for circumferential sliding movement relative to the body 1.

The width of the strip 8 is slightly in excess of the width of the opening 6 and the internal bore of the body 2 is slightly enlarged for a longitudinal distance in excess of the width of the opening 6 so as to provide shoulders 9 and 10 between which the strip 8 is received. One end of the strip 8 may be bent outwardly as indicated at 11 and narrowed sufficiently to extend through the opening 6 to provide a fingerpiece by which the strip 8 may be readily grasped and moved either to the position indicated in dotted lines at 12 in Fig. 3 exposing the opening 6 or to the position shown in full lines in Fig. 3 closing the opening 6.

The lower end of the body 1 is provided with an internal longitudinally extending bore 13 adapted to slidably receive a pressure foot 14 comprising an elongated cylindrical member, the lower end of which is provided with an axial opening or bore 15 through which the drill 7 may project. The bore 15 may be formed with a diameter just sufficient to permit the free passage of a particular sized drill 7 therethrough or the bore may be formed of considerably larger diameter and a bushing 16 may be pressed into this enlarged bore having an internal opening just sufficiently large to permit the free passage of the drill 7 therethrough.

I prefer the construction employing the bushing since it permits the mass production of a single sized pressure foot for a considerable number of different sized drills, each pressure foot being then adapted to a particular sized drill by utilizing the correct sized bushing 16 therewith. In addition, this construction permits the employment of bushings formed of metal adapted to resist wear while the major portion of the pressure foot may be formed of different metal having other desirable characteristics.

The pressure foot 14 is normally urged downwardly as viewed in Figs. 1 and 2 (that is, outwardly with respect to the body 1) to an extended position such as that shown in Fig. 1 disposing the lower end of the pressure foot 14 either flush with or extending slightly beyond the outermost end of the drill 7 so that the pressure foot may be disposed against a workpiece to be drilled without exposing the workpiece to cutting, scratching or scarring by the drill 7 until the drilling machine or drill press head is positively pressed against the workpiece to perform the drilling operations.

The pressure foot is urged toward its extended position by means of a spring 17 received in a counterbore 18 extending from the upper end of the pressure foot 14, the lower end of the counterbore 18 comprising a shoulder 19 against which one end of the spring may bear while the opposite end of the spring bears against a shoulder 20 formed at the upper end of the bore 13 of the body member 1.

Outward movement of the pressure foot 14 is limited by a screw 21 extending radially through the body 1 to engage a longitudinally extending slot 22 formed in the outer surface of the pressure foot 14, the length of the slot 22 being such that its upper end 23 will engage the screw 21 when the pressure foot is in its fully extended position as shown in Fig. 1. Inward movement of the pressure foot is limited preferably by the engagement of the upper end of the pressure foot 14 with the shoulder 20 on the body 1.

It will be apparent from the foregoing description that the assembly of the drill guide pressure foot 14 in the bore 13 and with the spring 17 extending into the counterbore 18, the overall length of the drill guide between the outermost end of the drill chuck and the end of the drill 7 is reduced to a minimum and yet ample length of movement is permitted for the pressure foot to permit the drill to penetrate to a considerable depth into a workpiece to be drilled.

Any cuttings or chips which may ascend along the grooves of the drill 7 may be readily ejected from the pressure foot 14 by providing a counterbore 24 of considerably larger diameter than the drill diameter immediately to the rear of the bushing 16 and providing a laterally extending opening 25 in the side of the pressure foot. Any such cuttings will have ample room to become disengaged from the drill in the relatively large chamber defined by the counterbore 24 while the opening 25 which preferably extends as shown in Fig. 4 through substantially one-half of the cross-sectional area of the pressure foot 14 will provide ample ejection space for such cuttings.

It will be noted that, as shown in Fig. 2, the entire vertical height of the opening 25 will be exposed even when the pressure foot 14 has been retracted to its innermost position.

Figures 4, 6, 7:
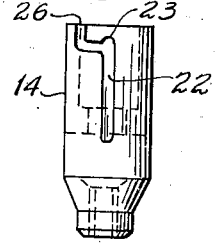
Fig. 4 is a transverse sectional view taken along the line IV—IV of Fig. 2.
Fig. 6 is a detail elevational view of the movable pressure foot employed in the practice of my invention.
Fig. 7 is a top plan view of the pressure foot shown in Fig. 6.

To facilitate the ready adaptation of one body to use with different diameters of drills, a number of pressure feet 14 having different sized bushings may be provided which may be readily interchanged by forming the slot 22 as a Z-shaped slot as shown in Fig. 6 wherein a branch slot 26 extends circumferentially and then longitudinally of the pressure foot 14 to the extreme upper end of the foot. The junction of the branch slot 26 with the longitudinal slot 22 is preferably slightly below the extreme upper end of the slot 22 as to provide at the upper end 23 a pocket which will prevent inadvertent rotation of the pressure foot to a position where it will disengage the screw 21. By merely pressing the pressure foot inwardly slightly to align the screw 21 with the branch slot 26, a partial rotation of the pressure foot will align the screw 21 with the vertical portion of the branch slot 26 and will permit the removal of the pressure foot from the body.

My drill guide assembly may be employed in combination with jigs by reducing the exterior diameter of the pressure foot 14 to provide at the outer end of the pressure foot a predetermined guide diameter as indicated at 27. Thus a templet 28 having jig holes drilled therein at the proper locations and having diameters corresponding substantially to the external diameter 27 of the pressure foot may be used to accurately align the end of the drill 7 in the precise spot above the workpiece 29 at which a hole is to be drilled.

The extreme outer end of the pressure foot 14 may be rounded off or tapered as shown at 30 to aid in centering or guiding the end of the pressure foot into the templet opening.

Figure 8:
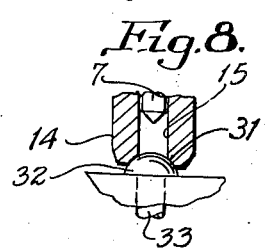
Fig. 8 is a detail sectional view of the lower end of a pressure foot peculiarly adapted for the drilling out of rivets.

In Fig. 8 I have illustrated a modification of the pressure foot 14 which will readily adapt my drill guide assembly to the drilling out of rivets by countersinking the outer end of the bore 15 as shown at 31, the shape of the countersunk portion being preferably rounded to conform with the rounded outer surface of the head 32 of a rivet 33 which is to be drilled out. Thus by placing the pressure foot against the rivet head, the drill 7 will be automatically aligned with the body of the rivet.

Figure 9:
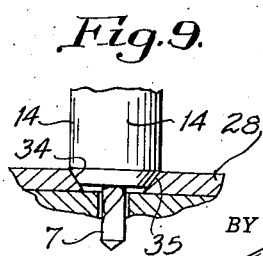
Fig. 9 is a detail view of the lower end of a pressure foot especially adapted for the centering of a drill in a jig or templet.

In Fig. 9 I have illustrated a still further modification which may be employed in the practice of my invention wherein the outer end of the pressure foot 14 is formed with a definite predetermined taper as indicated at 34 which is adapted to engage a corresponding tapered surface 35 on the templet 28 so that pressure exerted by the drill press or drilling machine will cause the tapered surfaces of the drill guide and templet to accurately center the drill 7 above the precise spot on the workpiece which it is desired to drill.

Figure 5:
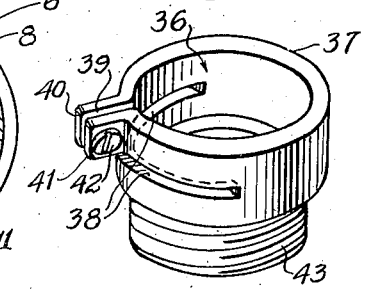
Fig. 5 is a perspective view of an attachment cover which may be employed with my drill guide pressure foot.

While I have illustrated in Figs. 1 and 2 the mounting of the body 1 directly upon a threaded boss projecting from the drill press or drilling machine, it may be desired to attach my drill guide to a machine which is provided with a smooth rather than a threaded extending boss. This may be readily accomplished by a mounting adaptor such as is illustrated in Fig. 5 as comprising a ring-like member 36 having an upper portion 37 formed with an internal diameter sufficient to receive therein the projecting boss of the drilling machine disposed immediately adjacent to the drill chuck.

The upper ring-like member 37 may be provided with a means for clamping the same upon the boss as by slotting the ring as indicated at 38 and splitting the uppermost portion thereof as indicated at 39 and forming a pair of ears 40 and 41 to extend radially of the ring 37 for the reception therethrough of a clamping bolt or screw 42.

The lower portion of the adaptor is formed as a ring-like member 43 having an external diameter conforming with the internal diameter of the threaded coupling portion 4 of the body 1 of my drill guide, the portion 43 being provided with external threads adapted to threadedly engage the threaded coupling member 4 of the drill guide. The adaptor 36 may be constructed as a casting or may be formed from sheet material rolled into the shape shown in Fig. 5 and threaded.

It will be apparent from the foregoing description that I have provided a drill guide assembly in which a guide body is readily mountable upon existing drill machines and in which a drill guide member or pressure foot is provided which is retractable along the drill as the drill penetrates into the workpiece, while during the entire drilling operations the guide member forms a bearing disposed immediately adjacent to the workpiece to act as a bearing upon which the drill 7 may rotate and be held in axial alignment with the chuck 3 of the drilling machine.

It will also be apparent that by reason of the assembly of the pressure foot in a bore or socket which extends upwardly into the drill guide body and then providing a counterbore in the pressure foot to receive and house the spring, the entire assembly may be made extremely short and yet provide for a sufficient movement of the pressure foot from its extended to its retracted position to accommodate the maximum depth of hole for which a standard length of drill may be expected to bore.

It will also be noted that the construction of the pressure foot to be retracted into the body permits the external diameter of the pressure foot to be relatively small while tapering or reducing the diameter of the extreme outer end of the pressure foot provides an ample guide for the drill but presents against the workpiece a relatively small area, thus permitting access to and visibility of substantially all of the workpiece except that small area immediately surrounding the point at which the hole is to be drilled.

The relatively small diameter of the outer end of the pressure foot permits the use of a jig in which the holes in the jig are bored to fit the outer surface of the pressure foot end. Thus the entry of the pressure foot into the hole of the jig insures against wear or destruction of the jig by contact with the drill itself.

While in the foregoing description the use of the guide has been specifically described in connection with a drill, it will be apparent that the same structure may be used for stop countersinks and other tools in which it is desired that the drill or stop counter-sink or other tool shall penetrate only a predetermined distance into a workpiece by arranging the length of the tool such that when the pressure foot is in its fully retracted position the tool will extend the correct distance beyond the outer end of the pressure foot.

While I have shown and described the preferred embodiment of my invention, I do not desire to be limited to any of the details of construction shown or described herein, except as defined in the appended claims.

I claim:

1. In a drill guide for use with drilling machines, a body member attachable to the machine and having a chamber extending from one end thereof to surround the chuck of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, and means normally urging said guide member to its extended position.

2. In a drill guide for use with drilling machines, a body member attachable to the machine and having a chamber extending from one end thereof to surround the chuck of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, shoulder means on said guide member spaced from the inner end thereof, and a spring engageable with said shoulder means and said body member to normally urge said guide member to its extended position.

3. In a drill guide for use with drilling machines, a body member attachable to the machine and having a chamber extending from one end thereof to surround the chuck of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, shoulder means on said guide member spaced from the inner end thereof, and a helical spring extending longitudinally of said guide means and engageable with said shoulder means and said body member to normally urge said guide member to its extended position.

4. In a drill guide for use with drilling machines, a body member attachable to the machine and having a chamber extending from one end thereof to surround the chuck of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, a spring for normally urging said guide member to its extended position, and a counterbore extending into said guide member from the inner end thereof to form a longitudinally extending pocket for receiving said spring, the inner end of said counterbore defining a shoulder against which one end of said spring may bear.

5. In a drill guide for use with drilling machines, a body member attachable to the machine and having a chamber extending from one end thereof to surround the chuck of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, means normally urging said guide member to its extended position, a chamber in said guide member spaced inwardly from said bearing to receive cuttings from said drill, and an outlet extending laterally of said guide member communicating with said chamber to provide an exit for such cuttings.

6. In a drill guide for use with drilling machines, a body member attachable to the machine and having a chamber extending from one end thereof to surround the chuck of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, means normally urging said guide member to its extended position, means for removably securing said guide member to said body member comprising a longitudinally extending slot in the surface of said guide member having a length equal to the length of travel of said guide member between said retracted and extended positions, and means on said body member projecting into said bore to engage said slot.

7. In a drill guide for use with drilling machines, a body member attachable to the machine and having a chamber extending from one end thereof to surround the chuck of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, means normally urging said guide member to its extended position, means removably securing said guide member to said body member comprising a slot formed in the outer surface of said guide member having a longitudinally extending branch of a length equal to the length of travel of said guide member between said extended and retracted positions and terminating in spaced relation to the inner end of said guide member, a second longitudinally extending branch spaced laterally from said first branch and extending to the inner end of said guide member and a laterally extending branch interconnecting said longitudinal branches, and means on said body member projecting into said bore to engage said slot.

8. In a drill guide for use with drilling machines, a body member attachable to the machine and having a chamber extending from one end thereof to surround the chuck of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, means normally urging said guide member to its extended position, and means on the outer end of said guide member engageable with a jig for centering said guide and the drill in said jig.

9. In a drill guide for use with drilling machines, a body member attachable to the machine and having a chamber extending from one end thereof to surround the chuck of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, means normally urging said guide member to its extended position, and a concave depression in the outer end of said guide member concentric with said bearing for centering said guide and drill upon a concave surface.

10. In a drill guide for use in drilling machines, a body member having a chamber extending from one end thereof to surround the chuck of said machine, threaded means adjacent said end of said body member for engaging a stationary threaded member of said machine, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, and means normally urging said guide member to its extended position.

11. In a drill guide for use in drilling machines, a body member having a chamber extending from one end thereof to surround the chuck of said machine, threaded means adjacent said end of said body member, an adaptor including means for clampingly engaging a stationary portion of the drilling machine adjacent the chuck and having a threaded coupling for threaded engagement with the threaded means of said body member, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, and means normally urging said guide member to its extended position.

12. In a drill guide for use with drilling machines, a body member attachable to the machine and having a chamber extending from one end thereof to surround the chuck of said machine, an outlet formed in said body member communicating with said chamber to provide access to the chuck, a closure for said outlet, a bore extending from the other end of said body concentric with a drill in the chuck, a guide member in said bore slidable longitudinally of the body from an extended position to a retracted position and having at its outer end a bearing through which the drill may project to constitute a guide bearing for the drill disposed immediately adjacent the surface of a workpiece to be drilled, and means normally urging said guide member to its extended position.

LOUIS A. SPIEVAK.